Patented Feb. 28, 1950

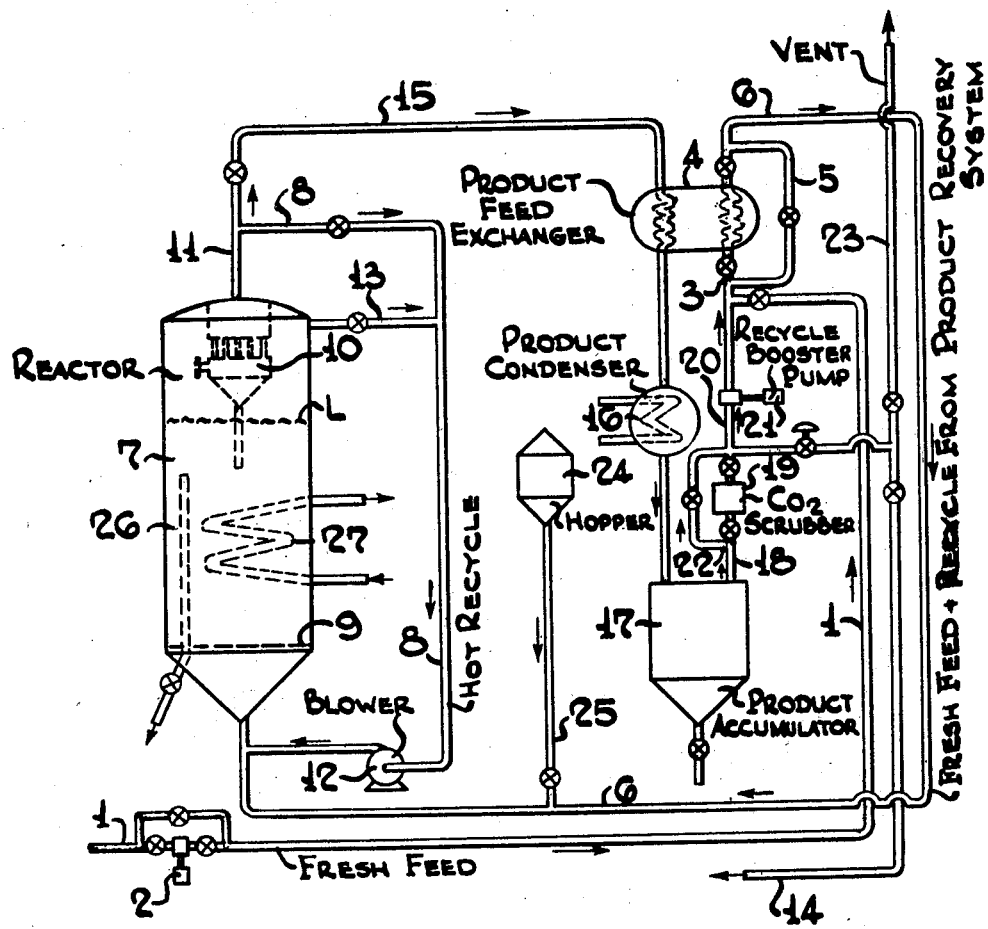

2,498,838

UNITED STATES PATENT OFFICE 2,498,838

SYNTHESIS OF HYDROCARBONS

Lindsay I. Griffin, Baton Rouge, La., assignor to Standard Oil Development Company, a corporation of Delaware Application September 12, 1945, Serial No. 615,859

9 Claims. (Cl. 260—449.6)

The present invention relates to the synthesis of hydrocarbons from carbon oxides and hydrogen in the presence of a suitable catalyst. More specifically, the invention is concerned with a process of converting carbon oxides with hydrogen into hydrocarbons having more than one carbon atom per molecule in the presence of a powdered catalyst maintained in a fluidized state.

The synthesis of hydrocarbons from carbon oxides and hydrogen is a highly exothermic reaction and at the same time extremely sensitive to variations in temperature. The optimum reaction temperature for the production of any desired non-gaseous hydrocarbon products may lie anywhere between the approximate limits of 350° and 800° F., depending on the character and activity of the catalyst, the throughput and composition of the synthesis gas and the reaction pressure. For instance, the production of satisfactory yields of normally liquid hydrocarbons from a mixture of carbon monoxide and hydrogen in the ratio of 1:2 at pressures ranging from atmospheric to about 100 lbs. per square inch in the presence of a fresh cobalt catalyst requires a reaction temperature of about 360° F., while the use of a fresh iron catalyst at elevated pressures around 300 lbs. per square inch requires temperatures as high as 500° F. and higher. Deviations of a few degrees F. from the optimum temperatures cause either a sharp drop of the rate of conversion or the formation of undesired gaseous products or the deposition of carbon or carbon-containing compounds on the catalyst resulting in yield losses and/or premature catalyst deactivation. In view of the large amounts of heat evolved in the reaction and of the detrimental influence of even the slightest temperature variations, efficient heat withdrawal and exact temperature control are the most critical single factors for a successful operation of the hydrocarbon synthesis.

Various means of heat withdrawal and temperature control have been adopted in the hydrocarbon synthesis art. In fixed bed operation heat exchanger reactors have been employed which are composed of bundles of narrow tubes bathed by a cooling agent so as to bring all parts of the catalyst in close proximity to cooling surfaces. The height of these catalyst tubes must be limited to about 3 to 5 ft., in order to avoid the temperature drop due to the dilution of the synthesis gas with reaction products. The construction, maintenance and operation of such reactor on a commercial scale are expensive and cumbersome.

In order to avoid a subdivision of the catalyst into narrow layers of limited height, it has been suggested to achieve heat withdrawal and constancy of temperature throughout fixed catalyst beds of theoretically unlimited dimensions by recirculating to the reactor large quantities of product gases of a predetermined temperature together with a relatively small amount of fresh synthesis gas. Most of the recycle gas is returned to the reactor prior to product recovery and at about the temperature prevailing at the reactor entrance. A small amount of the product gases, roughly corresponding to the amount of fresh feed gas supplied, is withdrawn for product recovery and may thereafter likewise be recycled to the reactor to effect further cooling and to aid in the removal of reaction products from the reactor. Total recycle ratios of 20 to 200 volumes of gas recycled per volume of fresh feed gas are required for the desired cooling effect. The maintenance of such high recycle ratios involves extremely high investment and operating cost, decreases considerably the product output per unit volume of reactor space and renders the recovery of liquid products from the diluted reaction gases extremely difficult.

A basically different solution of the problem has been found in the application of the fluid solids technique to the hydrocarbon synthesis. In this process solid catalyst particles are suspended in a gaseous stream and the suspension is introduced into the reaction zone to form therein a dense, mobile, fluidized mass of catalyst through which the gaseous reactants are passed. The mobile, fluidized state of the catalyst permits most effective contact with the gaseous reactants and the cooling surfaces contacting the dense phase, affording excellent heat transfer and uniformity of temperature throughout catalyst masses by greatly increased cross section and height. The desired exact temperature control may be easily achieved by indirect heat exchange, no gas recycle being required for cooling purposes.

However, gas recycle in technically and economically efficient low ratios of about 4 to 20 volumes of recycle gas per volume of fresh gas is desirable for fluid operation, particularly at high pressures ranging from about 75 to 600 lbs. per square inch, which are conducive to the production of gasoline of high octane rating. Gas recycle facilitates the fluidization of the catalyst in the reaction zone by supplying a method of controlling the superficial gas velocity in the reactor that is independent of the fresh feed rate. For this purpose the gases and vaporous products leaving the reactor may be directly recycled or the gases remaining after the recovery and removal of desired and undesired synthesis products may be recycled to the reactor. My invention pertains in its more specific aspects to a new method of recycling product gases to a synthesis reactor containing a powdered fluidized synthesis catalyst.

The main object of my invention, therefore, is to maintain a powdered catalyst for the synthesis of hydrocarbons from carbon oxides and hydrogen in a dense, fluidized condition without detrimentally affecting the temperature and conversion rate of the synthesis reaction.

Another object of my invention is so to control the recycle of product gases to a hydrocarbon synthesis reactor containing powdered synthesis catalyst that the catalyst is maintained in the fluidized state without detriment to the synthesis reaction.

Another object of my invention is to maintain a powdered synthesis catalyst in the fluidized state under super atmospheric pressures.

Another object of my invention is to utilize product gases prior to the recovery of liquid products and to utilize product gases remaining after the recovery of liquid products for maintaining a powdered synthesis catalyst in the fluidized state without affecting the conversion rate of the synthesis reaction.

Another object of my invention has to do with a proper rate of removal of reaction products from the reaction zone.

A still further object of the invention has to do with the removal of undesired impurities accumulating in the recycle gas stream.

Other and further objects and advantages of my invention will appear from the following more detailed description and claims. In the accompanying drawing, which forms part of the instant specification and is to be read in conjunction therewith, the figure is a diagrammatic view of apparatus capable of carrying out the method of my invention.

I have found that the quantity of recycle gas needed to maintain the catalyst in a fluidized state at elevated pressures exceeds considerably the quantity of recycle gas needed to prevent product accumulation on the catalyst while being at the same time considerably smaller than the amount of recycle gas needed for total heat withdrawal and temperature control in fixed bed reactors. I have also found that only a relatively small fraction of the total recycle gas need be freed of reaction products in order to maintain the product concentration in the reactor circuit at a desirable low value.

Applying these discoveries, I achieve considerable improvements of the synthesis carried out in the presence of a fluidized catalyst, particularly at elevated pressures, by splitting the total recycle gas stream so that the major part is recycled hot i. e. substantially at the temperature of its withdrawal directly from the reactor outlet to the reactor inlet and a minor part is first passed through the product recovery system and from there recycled after heat exchange to the reactor inlet, while withdrawing heat from the catalyst mass by indirect heat exchange within the reactor. In general, satisfactory results may be obtained when the ratio of total recycle gas to fresh feed gas is maintained below 20, preferably between the approximate limits of 1.5 and 10, and the ratio $R$ of moles of recycle gas from the recovery system to moles of hot recycle gas directly from the reactor outlet is kept below 1, preferably below 0.5, say between 0.1 and 0.5.

More particularly referring now to the drawing, fresh synthesis gas in the desired proportion of carbon monoxide to hydrogen is fed to the system through line 1 by compressor 2 and mixed with cold recycle gas flowing through line 3, as will appear more clearly below. Usually the molar ratio of CO to $H_2$ in the fresh synthesis gas will vary between 1:1 and 1:2 depending upon the catalyst, operating pressure and temperature, and characteristics of the product desired. The mixture of fresh feed and cold recycle gases may be passed through heat exchanger 4 in heat exchange with hot product gases or it may by-pass heat exchanger 4 through line 5 to enter line 6 which feeds directly into the bottom of reactor 7. Prior to its entry into the bottom of reactor 7 the gas mixture in line 6 receives from line 8 an amount of hot recycle gas sufficient to establish the total gas throughput required for maintaining optimum conditions in reactor 7, as will be explained in more detail below.

Reactor 7 contains finely divided synthesis catalyst having a particle size of from 100 to 400 mesh, preferably about 200 mesh. The gas mixture from line 6 enters the catalyst zone of reactor 7 through a distribution plate 9 at a velocity controlled within the limits of from ¼ to 10 ft. per second so as to maintain the catalyst in the form of a dense, highly turbulent, fluid mass having a well-defined upper lever L which is determined by the amount of catalyst present in the reactor and the superficial velocity of the fluidizing gas. Due to the phenomenon of hindered settling of catalyst particles, only a small proportion of the powdered catalyst is carried into the zone above the level L, which serves as a catalyst disengaging zone. For instance, the fluidized catalyst in the catalyst zone below the level L may have a density of 15 to 60 lbs. per cu. ft., while the catalyst density above the level L may be as low as 0.01 lb. per cu. ft. The catalyst particles reaching the disengaging zone are separated from the reacted gas in separator 10 and the gas freed of catalyst leaves reactor 7 through line 11. A major portion, preferably 50 to 90% or more, of the hot product gas is recycled through line 8 or line 13 with the aid of blower 12 to line 6 close to its entry into reactor 7. An appreciable saving in catalyst recovery equipment can be made by withdrawing the hot recycle through line 13 rather than through line 8. The small concentration of catalyst entrained in the hot recycle withdrawn through line 13 can be returned to the reactor through blower 12 and only sufficient catalyst recovery equipment need be installed to remove the entrained solids from the much smaller gas stream directed to the product recovery system. The amount of hot gas recycled through line 8 is so controlled as to establish in the reactor inlet a molar ratio of cold recycle gas to hot recycle gas of less than one, preferably between 0.1 and 0.5, and a ratio of total recycle gas to fresh feed gas between the approximate limit of 1.5 and 10. The combined recycle and fresh gas supplied to reactor 7 is sufficient in quantity to maintain the catalyst in the desired fluidized state and its concentration of reaction products is low enough to afford a satisfactory removal of reaction products from the reaction zone. The recycle ratios mentioned also permit the maintenance of the desired high pressures ranging from about 75 to about 600 lbs. per square inch in reactor 7 without detrimentally affecting the fluid turbulent state of the catalyst mass.

The product gases directed to the product recovery system pass from line 11 through line 15 and heat exchanger 4 into product condenser 16 and product accumulator 17 from which they are withdrawn through line 18 after separation of the desired condensable hydrocarbons. The cold lean gas is either as a whole or in part passed through scrubber 19 to remove carbon dioxide and then returned through line 20 by way of recycle booster 21 to lines 3 and 6 to be recycled to the reactor as described above. It should be noted that only a small portion of the total product gases need pass through the $CO_2$ scrubber. A very appreciable reduction in the $CO_2$ concentration of the reactor circuit may be obtained when as little as 1/5 to 1/50 of the total recycle gas is treated continuously in the scrubber 19 which may be by-passed through line 22. Any excess gas leaving product accumulator 17 and not needed for recycling may be in part diverted through line 14 to a plant manufacturing synthesis gas and in part vented through line 23. The inert concentration in the reactor circuit is controlled by venting the necessary amount of gas at the outlet of the $CO_2$ scrubber through line 23. The $CO_2$ recovered from the $CO_2$ scrubber solution may be directed to a synthesis gas manufacturing plant where it is used in the preparation of synthesis gas.

Fresh catalyst may be admitted either continuously or intermittently from hopper 24 through line 25 to be suspended in the gas flowing through line 6. Spent catalyst may be withdrawn from reactor 7 continuously or intermittently through line 26, both in a manner known per se in the fluid catalyst technique.

In addition to the greater ease of controlling the temperature and rate of conversion in the reaction zone, the splitting of the gas recycle in accordance with my invention has considerable further advantages which are as follows: A lesser amount of exchanger surface is needed outside of the reactor since more of the heat of reaction can be removed at reactor temperature, the highest possible temperature level, by immersing the heat transfer surface needed to remove the heat of reaction in the dense phase catalyst contained in the reactor as indicated schematically at 27; because a larger overall heat transfer coefficient can be obtained in the reactor as compared with the coefficient obtainable in a gas-to-gas exchanger, the total amount of heat transfer surface is minimized; if it is desired to reduce the $CO_2$ concentration in the reactor, this can be done by scrubbing only a part of the total recycle stream, namely, a part or all of the gas passing through the product recovery system; also, the concentration of water vapor and product hydrocarbons may be kept at the desired low level in the reactor circuit by passing only a relatively small part of the total recycle stream through the product recovery section.

Catalysts of the types known in the art of the hydrocarbon synthesis may be used in my process at relatively low pressures, that is up to about 150 lbs. per square inch, and low temperatures varying between about 350° and 425° F. Cobalt supported on an inert carrier is preferred for this purpose. At higher pressures up to about 600 pounds and for temperatures ranging from 450° to 700° F., iron-containing catalysts are more suitable for the production of high octane motor fuels.

In order to illustrate the invention further, the following examples are given, which should not be construed as limiting the same in any manner whatsoever.

EXAMPLE I

The conditions maintained in reactor 7 are as follows:

Operating temperature_____°F__ 500
Operating pressure_____p. s. i.__ 300
Superficial velocity at reactor inlet__ft./sec.__ 1.0
Volume of dense phase in reactor_____CF__ 1250
Diameter of reactor_____ft__ 10
Height of dense phase_____ft__ 15.9
Particle size of iron or iron type catalyst _____mesh__ 200
Throughput of fresh feed_____V./V./Hr__ 500
Composition of fresh feed:
    CO_____per cent__ 43
    $H_2$ _____do_____ 43
    $CO_2$ _____do_____ 14
Volume of fresh feed per hour at reaction conditions _____CFH__ 62,600

At these conditions the total volume of gas to be recycled for optimum performance amounts to 220,350 CF per hour at reaction conditions, corresponding to a recycle to feed ratio of 3.52. About 40,800 CF per hour of the total recycle are cold gases recycled from the product recovery and $CO_2$ scrubbing system at a temperature of about 100° F., while about 179,550 CF per hour are hot gases recycled directly from the reactor outlet at the reactor outlet temperature to establish a cold:hot recycle ratio of R=0.227.

The advantages of this procedure over hot recycle alone (R=0) or cold recycle alone (R=∞) at otherwise identical conditions are illustrated by the data given in the following table:

*Composition of feed to and product from reactor for three values of $R^1$*

| | $R^1=0.0$ | | | $R^1=0.227$ | | | $R^1=\infty$ | | |
|---|---|---|---|---|---|---|---|---|---|
| | Feed [2] | Product | Average | Feed [2] | Product | Average | Feed [2] | Product | Average |
| Mole per cent CO | 20.93 | 14.65 | 17.79 | 33.05 | 28.00 | 30.53 | 40.70 | 36.37 | 38.54 |
| Mole per cent $H_2$ | 20.93 | 14.65 | 17.79 | 33.05 | 28.00 | 30.53 | 40.70 | 36.37 | 38.54 |
| Mole per cent Reactants (CO+$H_2$) | 41.86 | 29.30 | 35.58 | 66.10 | 56.00 | 61.06 | 81.40 | 72.74 | 77.08 |
| Mole per cent $CH_4$ | 5.70 | 7.32 | 6.51 | 11.77 | 14.00 | 12.88 | 15.50 | 18.17 | 16.83 |
| Mole per cent $CO_2$ | 38.76 | 45.81 | 42.28 | 16.85 | 21.68 | 19.26 | 3.10 | 6.57 | 4.83 |
| Mole per cent $H_2O$ | 11.40 | 14.65 | 13.03 | 4.40 | 6.94 | 5.67 | 0.00 | 2.10 | 1.05 |
| Mole per cent $C_{10}H_{20}$ | 2.28 | 2.92 | 2.60 | 0.88 | 1.38 | 1.13 | 0.00 | 0.42 | 0.21 |

[1] $R=\dfrac{\text{Moles of recycle from product recovery system}}{\text{Moles of hot recycle}}$

[2] Total feed including recycle.

The data tabulated above show that:
(1) The maximum concentration of condensable hydrocarbon product is obtained in the total product gas when R=0. This is a distinct advantage in that it reduces the burden on the product recovery system. However, the concentration of reactants in the reactor is extremely low, resulting in an inefficient use of the catalyst and a low rate of conversion.

(2) The maximum concentration of reactants ($CO+H_2$) is obtained in the reactor when $R=\infty$. This also is a distinct advantage in that the high concentration of reactants results in more efficient use of catalyst thus requiring less catalyst and a smaller reactor for the production of a given quantity of liquid product. However, the concentration of condensable hydrocarbon product is undesirably low.

(3) Optimum conditions are obtained when R lies between 0 and $\infty$, e. g. R=0.227. For this value of R a high concentration of reactants is maintained in the reactor and a high concentration of condensable hydrocarbon product is obtained in the total product gas.

In addition to the advantages listed above, split recycle makes possible the use of a relatively inexpensive blower to handle most of the recycle gas rather than more expensive equipment that would be needed if all of the recycle were carried through the product recovery system.

Split recycle is superior to total recycle through the product recovery system in still another respect. If split recycle is employed, only that portion of the total recycle stream that passes through the product recovery system has to be freed of entrained catalyst. The very small concentration of catalyst in the hot recycle stream would be returned to the reactor and thus would not be lost from the reactor circuit.

Finally, split recycle requires less heat transfer surface than is required if all of the product gases are recycled through the product recovery system. Less heat transfer surface is needed with split recycle because the major portion of the transfer surface can be located in the dense catalyst phase contained in the reactor where a more favorable transfer coefficient is obtained than is possible with a gas-to-gas exchanger.

EXAMPLE II

In another run the synthesis gas is freed of $CO_2$ prior to its entry into the system and thus brought to a CO and $H_2$ content of substantially 50% each. No $CO_2$ is scrubbed from the gas recycled. If the gas compositions obtained in this procedure are compared with those obtained when the product system recycle stream is scrubbed free of $CO_2$, all other conditions being the same as given in Example I, the following results are obtained:

| | Average Composition of Material in Reactor [2] | | | |
|---|---|---|---|---|
| | $R$ [1] $=0.227$ | | $R$ [1] $=0.4$ | |
| | $CO_2$ Scrubbed from Feed | $CO_2$ Scrubbed from Recycle | $CO_2$ Scrubbed from Feed | $CO_2$ Scrubbed from Recycle |
| Mole per cent CO | 25.40 | 30.53 | 26.00 | 33.25 |
| Mole per cent $H_2$ | 25.40 | 30.53 | 26.00 | 33.25 |
| Mole per cent reactants ($CO+H_2$) | 50.80 | 61.06 | 52.00 | 66.50 |
| Mole per cent $CH_4$ | 10.30 | 12.88 | 10.60 | 14.00 |
| Mole per cent $CO_2$ | 31.00 | 19.26 | 31.80 | 14.30 |
| Mole per cent $H_2O$ | 6.40 | 5.67 | 4.70 | 4.30 |
| Mole per cent $C_{10}H_{20}$ | 1.30 | 1.13 | 0.90 | 0.90 |

[1] $R = \dfrac{\text{Moles of recycle from product recovery system}}{\text{Moles of hot recycle}}$

[2] Feed gas+reactor output in mole percent.

The data in the above table demonstrate that all other things being equal, reactants can be maintained at a higher concentration in the reactor circuit by scrubbing $CO_2$ from the recycle stream rather than by scrubbing $CO_2$ from the fresh feed.

If, instead of a single scrubber shown in the flow diagram, for reasons of simplicity, two or more scrubbers are employed, that portion of the product gas that is vented can be freed of $CO_2$ in one or more of the scrubbers while the fresh feed is introduced at the inlet of the remaining scrubbers. With this arrangement the $CO_2$ would be scrubbed from the feed and that portion of the recycle that passes through the product recovery system. This arrangement would therefore insure the highest possible concentration of reactants in the reactor circuit. To prevent the accumulation of methane and other non-condensable hydrocarbons in the reactor circuit, a stream of product gas can be withdrawn from the system after the product accumulator and ahead of the $CO_2$ scrubbing section. This stream can be returned to a synthesis gas preparation section and reconverted into CO and $H_2$.

The process of this invention is not limited by any theory or mode of operation but only by the following claims:

1. Process for producing hydrocarbons from carbon oxides and hydrogen, which comprises passing a mixture of carbon oxides and hydrogen at a synthesis temperature through a reaction zone in contact with a dense turbulent mass of finely divided fluidized synthesis catalyst forming a well defined upper level which separates said mass from an upper low density catalyst zone, withdrawing heat from said mass by indirect heat exchange within said reaction zone, withdrawing product gases from the catalyst, recycling a major portion of the product gases substantially at the temperature of their withdrawal directly to the catalyst, passing a minor portion of the product gases through a product recovery system to remove reaction products therefrom and recycling tail gas from the product recovery system to the catalyst, the amount of total gas recycled to the catalyst being less than 20 times and at least 1.5 times the volume of fresh feed gas but sufficient to maintain the catalyst in a highly turbulent state and the ratio of gas recycled from the product recovery system to gas recycled directly to the catalyst falls within the range of about 0.1 to about 0.5.

2. The process as claimed in claim 1 in which the catalyst comprises metallic iron and has a particle size of from 200 to 400 mesh and the mixture of carbon oxides and hydrogen is reacted at temperatures ranging from about 450° to 650° F. and pressures ranging from about 75 to about 400 lbs. per square inch.

3. The process as claimed in claim 1 in which the ratio of total recycle gas to fresh feed gas is maintained between about 1.5:1 and 10:1.

4. The process as claimed in claim 1 in which at least a portion of the gas leaving the product recovery system is scrubbed of $CO_2$ prior to its return to the catalyst.

5. The process as claimed in claim 1 in which the catalyst is cooled by heat transfer surfaces immersed in the fluidized mass of catalyst.

6. The process as claimed in claim 1 in which $1/5$ to $1/50$ of the total recycle gas is freed of carbon dioxide prior to its return to the reactor.

7. The process as claimed in claim 1 in which the major portion of product gases recycled directly to the catalyst contains at least a substantial portion of such catalyst particles as are carried by said gas out of said fluidized mass of catalyst into said low density zone and said minor portion of product gases is freed of entrained catalyst particles prior to its entry into the product recovery system.

8. The process as claimed in claim 1 in which said feed gas and said tail gas are preheated prior to their contact with said catalyst by heat exchange with said minor portion of product gases prior to the entry of the latter into said product recovery system.

9. Process for producing normally liquid hydrocarbons of the motor fuel boiling range from carbon monoxide and hydrogen, which comprises passing a synthesis gas mixture containing carbon monoxide and hydrogen in the ratio of about 1:1-2 at temperatures ranging from 450° to 650° F. and pressures ranging from about 75 to about 400 lbs. per square inch through a reaction zone containing a dense turbulent mass of finely divided fluidized synthesis catalyst comprising metallic iron and having a particle size of from 200 to 400 mesh, said mass forming a well defined upper level which separates said mass from an upper low density catalyst zone, withdrawing heat from said mass by heat transfer surfaces immersed in said mass, withdrawing product gases from the catalyst, recycling about 50% to about 90% of the product gases from said low density catalyst zone directly to the catalyst, substantially at the temperature of their withdrawal passing the remainder of the product gases through a product recovery system to remove reaction products therefrom, and recycling tail gas from the product recovery system to the catalyst, the ratio of total gas recycled to fresh feed gas being maintained between about 1.5:1 and 10:1, the ratio of gas recycled from the product recovery system to gas recycled directly to the catalyst within the range of about 0.1 to about 0.5, and the superficial velocity of the gas supplied to the catalyst between $1/4$ and 10 ft. per second.

LINDSAY I. GRIFFIN.

REFERENCES CITED

The following references are of record in the file of this patent:

UNITED STATES PATENTS

| Number | Name | Date |
|---|---|---|
| 2,224,048 | Herbert | Dec. 3, 1940 |
| 2,243,869 | Keith, Jr., et al. | June 3, 1941 |
| 2,279,052 | Michael | Apr. 7, 1942 |
| 2,345,957 | Wirth et al. | Apr. 4, 1944 |
| 2,347,682 | Gunness | May 2, 1944 |
| 2,360,787 | Murphree et al. | Oct. 17, 1944 |